United States Patent
Schricker

Patent Number: 5,878,179
Date of Patent: Mar. 2, 1999

[54] OPTICAL DEVICE WITH COMPRESSIBLE LAMINATE

[76] Inventor: Ulrich Schricker, Am Kreuzacker 13, 91154 Roth, Germany

[21] Appl. No.: 880,965

[22] Filed: Jun. 23, 1997

[30] Foreign Application Priority Data

Jul. 2, 1996 [DE] Germany .................. 196 26 514.2

[51] Int. Cl.⁶ ................................................ G02B 6/44
[52] U.S. Cl. ...................... 385/100; 385/102; 385/114
[58] Field of Search ..................................... 385/100–114

[56] References Cited

U.S. PATENT DOCUMENTS

| | | | |
|---|---|---|---|
| 3,984,172 | 10/1976 | Miller | 350/96 B |
| 4,090,902 | 5/1978 | Ferrentino et al. | 156/177 |
| 4,138,193 | 2/1979 | Olszewski et al. | 350/96.23 |
| 4,537,469 | 8/1985 | Kircher | 350/96.24 |
| 5,189,721 | 2/1993 | Sayegh et al. | 385/114 |
| 5,253,318 | 10/1993 | Sayegh et al. | 385/114 |
| 5,292,390 | 3/1994 | Burack et al. | 385/114 X |
| 5,333,229 | 7/1994 | Sayegh | 385/102 |

FOREIGN PATENT DOCUMENTS

| | | |
|---|---|---|
| 0 349 206 | 1/1990 | European Pat. Off. . |
| 2 674 032 | 9/1992 | France . |
| 58-211711 | 12/1983 | Japan . |

*Primary Examiner*—Phan T. H. Palmer
*Attorney, Agent, or Firm*—Gary A. Samuels

[57] ABSTRACT

The invention relates to an optical device having a first laminate and a second laminate between which are disposed a first plurality of optical components arranged in a first plane. At least one of the first laminate and the second laminate includes a first layer having high mechanical strength and a second layer having high compressibility. Preferably, the laminate further includes adhesive for affixing the optical components. More preferably, the adhesive is an adhesive layer. The first layer has a tensile strength of 8,000–15,000 psi and the second layer has a density between 0.6 g/cm³ and 1.8 g/cm³. Preferably, the second layer is made from expanded PTFE. The adhesive layer is either a pressure-sensitive adhesive or is selected from the group of adhesives having the properties that it is tacky at room temperature and pressure and hardens at a temperature between 50° C. and 100° C.

36 Claims, 2 Drawing Sheets

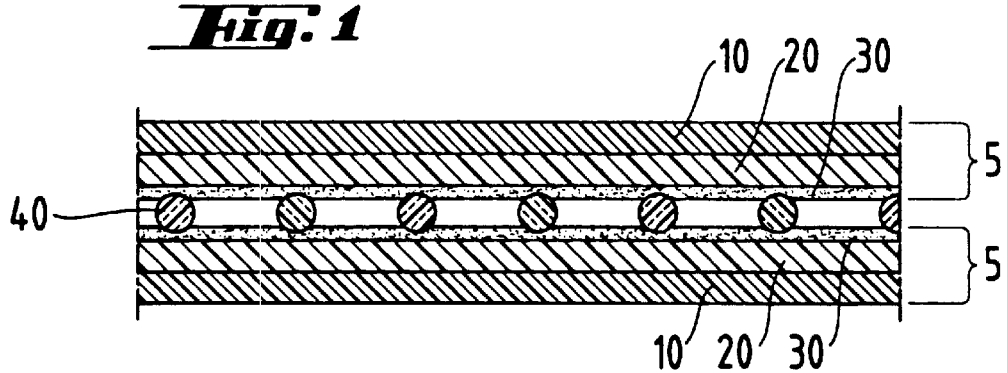
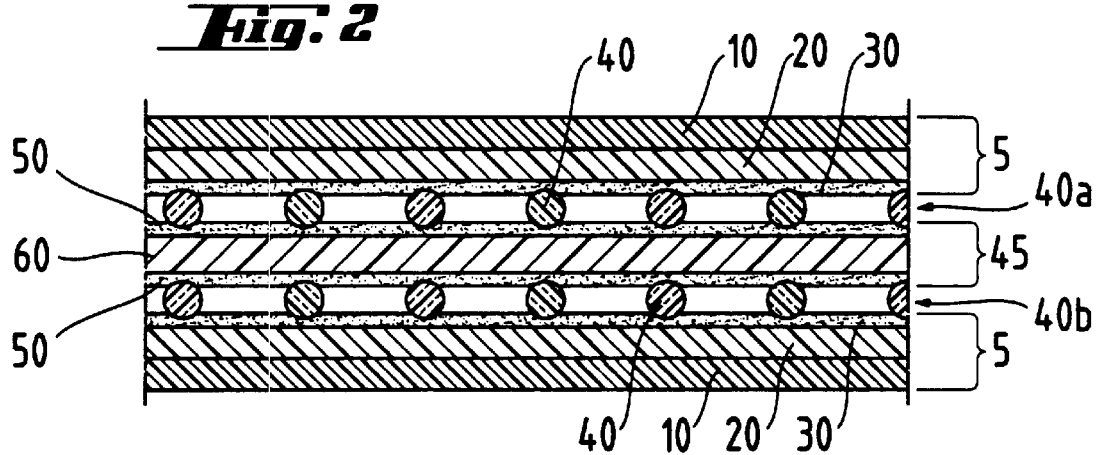
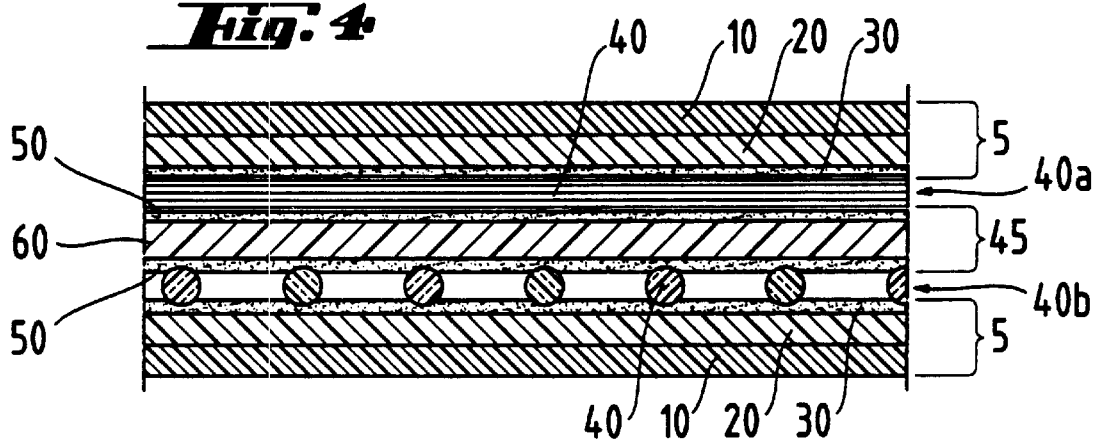

5,878,179

OPTICAL DEVICE WITH COMPRESSIBLE LAMINATE

FIELD OF THE INVENTION

This invention generally relates to optical devices. More particularly, the present invention relates to an optical device having first and second laminates between which are disposed a plurality of optical components.

Background of the Invention

Optical devices such as in the area of the present invention are known from U.S. Pat. No. 5,292,390 to Burack et al. which is assigned to AT&T Bell Laboratories. This patent teaches a method of manufacturing an optical device comprising a plurality of optical fibers which are bonded to the upper surface of a flat flexible plastic substrate and are then covered with a plastic material such as polyurethane to form a composite structure. The device taught in this patent has to be compressed in a first step at a first elevated temperature over 100° C. and then compressed at a pressure of 25 psi for one minutes. After cooling, the device is then heated in a second step to 200° C. and compressed at a pressure of 6 psi. The purpose of the first step is to ensure good adhesion between the layers of the composite. The second step enables the polyurethane or other thermoplastic layer to melt and snugly encase the optical fibers.

The method disclosed in the above-discussed patent has the disadvantage that the optical fibers within the optical device are subjected to high temperatures and pressures. As is well known, optical fibers are very sensitive to pressure and temperature. When subject to stress, cracks on a microscale can occur within the fiber which lead to a deterioration of its performance.

The foregoing illustrates limitations known to exist in present optical devices and methods of their manufacture. Thus, it is apparent that it would be advantageous to provide an improved optical device directed to overcoming one or more of the limitations set forth above. Accordingly, a suitable alternative is provided including features more fully disclosed hereinafter.

SUMMARY OF THE INVENTION

The present invention advances the art of optical devices, and the techniques for creating such optical devices, beyond which is known to date. In one aspect of the present invention, the optical device includes a first laminate and a second laminate, either of which comprise a first layer having high mechanical strength and a second layer having high compressibility. Preferably, the laminates have a fixation or attachment means for affixing the optical components. More preferably, this fixation means comprises an adhesive layer.

The first layer is designed to provide mechanical strength to the optical device to ensure that the device and the optical components within the device are protected from damage by longitudinal forces being applied to the device. The second layer acts as a cushion to support the optical components within the device. It absorbs much of the stress to which the optical device is subjected when it is bent or when pressure is applied to the surface of the optical device.

In one embodiment of the invention, the optical device further comprises a second plurality of optical components which are arranged in the same plane as the first plurality of optical components and cross one another. An optical device in which optical components such as optical fibers cross each other is known from the above-mentioned U.S. Pat. No. 5,204,925. The laminates described in this invention offer the advantage that damage to the optical components within the optical device is reduced compared to the prior art device since the second layer can absorb much of the point stress on the optical components at the point at which the optical components cross each other.

The optical device with a second plurality of components can be further provided with a third laminate also comprising a layer having high compressibility and at least one adhesive layer for affixing the optical components. In the device according to this embodiment, all direct crossing points of the optical components are eliminated and thus mechanical point stress is substantially reduced. The third laminate acts as a further cushion to absorb the mechanical stresses.

Advantageously, the first layer has a tensile strength of 8,000–15,000 psi, preferably 12,000 psi, and is made of polyester. The second layer should have an air porosity between 18% and 73%. It is made from the group of polymers consisting of expanded PTFE, polyethylene foams and polyurethane foams. Preferably, the second layer is made from expanded PTFE (ePTFE). Expanded PTFE has the advantage that it has a very low thermal coefficient of expansion and is chemically inert. It therefore protects the optical components from damage by chemicals and other environmental influences.

The adhesive layer can be either a pressure sensitive adhesive or is selected from the group of adhesives having the properties that it is tacky at room temperature and pressure and hardens at a temperature between 50° C. and 100° C. This allows the optical components to be laid on the surface of the laminates and their position changed during the manufacturing process. After heating the laminate to a temperature above the curing temperature of the adhesive, the adhesive hardens and affixes the optical components. Even after cooling of the optical device, the optical components remain fixed in their position. Compared to the prior art methods known from Pat. No. 5,292,390, the optical components are not heated to a high temperature and thus damage to the optical components is eliminated. Optical fibers, for example, are generally specified to operate at a temperature up to 120° C. The advantage of ePTFE is furthermore illustrated in this manufacturing method since ePTFE has a very low coefficient of thermal expansion and thus does not expand when the optical device is heated to a temperature to cure the adhesive.

The adhesive layer is preferably an adhesive tape selected from the group of adhesive tapes containing silicon, epoxy or acrylic adhesive soaked in ePTFE or an applied adhesive film being selected from the group of acrylic, silicone or epoxy adhesives.

It is, therefore, a purpose of the present invention to provide an optical device which is manufactured by a method in which high temperatures and pressures are avoided.

Another purposed of the present invention is to provide an optical device in which the position of the optical components within the optical device can be easily changed.

BRIEF DESCRIPTION OF THE DRAWINGS

The foregoing summary, as well as the following detailed description of a preferred embodiment of the invention, will be better understood when read in conjunction with the appended drawings. For purposes of illustrating the invention, there is shown in the drawings an embodiment which is presently preferred. It should be understood, however, that the invention is not limited to the precise arrangement and instrumentality shown. In the drawings:

FIG. 1 is a cross-sectional view of a laminate for optical components according to the invention;

FIG. 2 is a cross-sectional view of a laminate for optical components together with an intermediate layer;

FIG. 4 is a cross sectional view of a laminate for optical components together with an intermediate layer in which the optical fibers cross each other.

DETAILED DESCRIPTION OF THE INVENTION

Figure 3A:
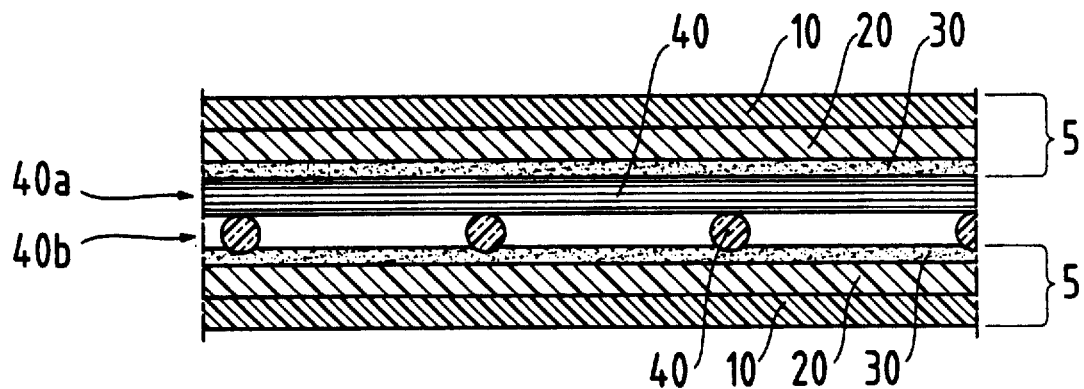
FIG. 3A is a cross-sectional view of an optical device using the laminate of the invention.

Referring now to the drawings, wherein similar reference characters designate corresponding parts throughout the several views, a laminate 5 for optical components according to the invention is shown in FIG. 1. The laminate 5 consists of a first polymer layer 10 which is laminated to a second polymer layer 20, the second polymer layer being coated on at least one side with an adhesive layer 30. In FIG. 1 the laminate 5 is used in an illustrative manner to enclose a plurality of optical fibers 40. The laminate 5 could also be used to enclose other optical components, such as optical amplifiers or wave guides.

The first polymer layer 10 is chosen to provide the laminate 5 with high mechanical strength to resist damage to the enclosed optical components 40 due to mechanical stress on the laminate 5. Such mechanical stress may be caused by longitudinal forces exerted on the laminate by external influences. In order to provide sufficient mechanical strength, the first polymer layer needs to have a high tensile strength. A tensile strength of 8,000–15,000 psi, preferably 12,000 psi, is sufficient to provide adequate mechanical protection. Furthermore, the coefficient of thermal expansion for the first polymer 10 should be similar to that of the optical components 40. A suitable polymer for use has been found to be polyester. However, other polymers having the required properties can be also used. One example of such a suitable polymer material is MIL-ENE® available from W. L. Gore & Associates.

The second polymer layer 20 is chosen to provide the laminate 5 with buffering properties in order to protect the enclosed optical components 40 from shear stresses. These stresses can be caused by bending the laminate 5 or by applying pressure to the surface of the laminate 5. In order to provide sufficient buffering properties, the second polymer layer needs to have a high compressibility. It has been found that microporous material with a density of between 0.6 g/cm$^3$ and 1.8 g/cm$^3$ is sufficient to provide adequate buffering properties. Furthermore, the coefficient of thermal expansion should be similar to that of the optical components 40 and to that of the first polymer 10. A suitable polymer for use has been found to be a microporous polymer. Examples of such polymers are expanded PTFE, polyethylene foams and polyurethane foams. Preferably, expanded PTFE is used which has a density between 0.6 g/cm$^3$ and 1.8 g/cm. The polymer has therefore an air porosity between 18% and 73%. The expanded PTFE used is preferably that disclosed and described in U.S. Pat. Nos. 3,953,566, 3,962,153, 4,096,227 and 4,187,390.

The first polymer layer 10 and the second polymer layer 20 are laminated together by coating the first polymer layer 10 with a thermoplastic adhesive and applying pressure and heat to the laminate. Suitable thermoplastic adhesives can be selected from the group of adhesives containing polyester-based adhesives, polyurethane adhesives, fluorinated ethylene-propylene copolymers (FEP) adhesives, and perfluoroalkyl ethers of PTFE. The temperature and pressure which have to be applied depend on the composition of the thermoplastic adhesives.

Alternatively, a pressure sensitive adhesive could be used to laminate the first polymer layer 10 to the second polymer layer 20. Examples of such tapes are manufactured by the 3M Corp. of St. Paul, Minn., and are made from a modified acrylic adhesive and sold under the brand name SCOTCH™. In this method, a pressure-sensitive adhesive tape is placed on the surface of the first polymer layer 10. On the pressure-sensitive adhesive tape, the second polymer layer 20 is placed. Pressure is then applied to the surface of the second polymer layer 20 and the first polymer layer 10 and the second polymer layer 20 then become laminated together.

After laminating the first polymer layer 10 and the second polymer layer 20 together, an adhesive layer 30 as a fixation means is applied to the surface of the second polymer layer 30. The adhesive 30 is used to attach the optical components 40 to the laminate 5. It is chosen such that the adhesive is tacky at room temperature but can be made hard by heating the laminate 5 and optical fiber 40 to a temperature below that at which the optical component is destroyed. The optical fiber 40 could, for example, be an acrylic-coated glass fiber which has a specified melting temperature of 125° C. The adhesive 30 used in this case needs to set at a temperature of less than around 120° C. to avoid damaging the optical component when heat curing the laminate 5 to set the adhesive 30.

Preferably, the adhesive 30 should set at a lower temperature since the greater the temperature to which the optical component 40 is heated to minimize the thermal stress to which the component is subjected. This thermal stress can cause degradation of the performance of the optical component 40 even if not destroying it completely. Preferably, the adhesive is therefore chosen to set at a temperature of around 80° C. Suitable adhesives for use are selected from the group of adhesives consisting of acrylic-based adhesives, silicone-based adhesives and epoxy-based adhesives. Such adhesives include epoxy-dicyanamide, silicone or cyanacrylate. These adhesives can be applied as a layer on the surface of the second polymer 20. The application can be done, for example, by spraying or coating the surface of the second polymer 20. Alternatively, the adhesive layer 30 can be made by soaking a thin film of a porous polymer such as expanded PTFE or polyester in one of the above adhesives to form a pressure-sensitive adhesive tape. Such pressure sensitive adhesive tapes have the advantages that the optical components 40 can be placed on the adhesive layer 30 and will be held in place but can be removed. Only after applying pressure do the optical components 40 become permanently attached to the adhesive tape. As mentioned above, pressure-sensitive adhesive tapes are manufactured by the 3M Corp. and sold under the brand name SCOTCH™.

The discussion above has assumed that the adhesive layer 30 was attached to the surface of the second polymer 20. However, the adhesive layer 30 could equally well be attached to the surface of the first polymer 10 without affecting the operation of the invention.

In the above illustrative example, it was assumed that the optical component 40 was an acrylic coated glass fiber.

However, the invention can also find application with quartz or plastic fibers. The coating on the glass cladding may optionally be a silicon, acrylic, polyimide or other release agent and a polymer coating.

The laminate 5 as described above can find application in multi-layer optical circuits such as that illustrated in FIG. 2 in which a plurality of optical fibers 40 are sandwiched between laminates 5. In FIG. 2, the same reference numbers are used to designate similar parts of FIG. 1. Between the two layers 40a and 40b comprising a plurality of optical fibers 40, an intermediate layer 45 is placed. The intermediate layer 45 comprises a layer of microporous material 60 is placed which is coated on both sides with a further layer of adhesive 50 as a further fixation means. The microporous layer can be made from a polymer such as expanded PTFE, polyester foam or polyurethane foam which is able to absorb mechanical stress. The microporous material is preferably made from expanded PTFE with a density between 0.6 g/cm$^3$ and 1.8 g/cm$^3$. This material acts as a buffer layer absorbing stresses between the optical fibers. The adhesive layer is made from the same type of adhesive as the adhesive layers 30.

Figure 3B:
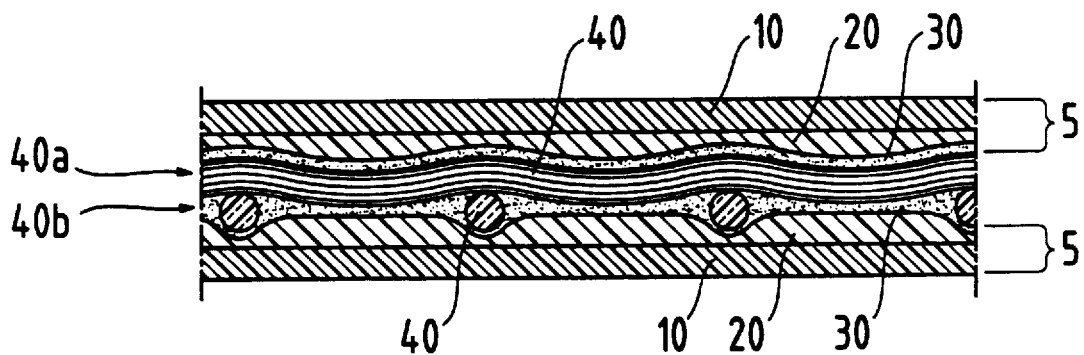
FIG. 3B is a cross-sectional view of an optical device using the laminate of the invention in which the compressibility of the laminate is illustrated.

In FIG. 2, the optical fibers are shown running parallel to each other in the adjacent layers. The laminate 5 is particularly useful in optical devices in which the optical fibers 40 cross each other as is illustrated in FIG. 3A and FIG. 3B. FIG. 3A is a stylistic figure to illustrate the construction of the optical device. In accordance with the invention, however, the second layer 20 will be compressed as shown in FIG. 3B in order to absorb the load of the optical fiber 40. The first polymer layer 10 will also be slightly deformed. However, it does not offer the same advantages of compressibility and thus is shown as being uncompressed in FIG. 3B. In FIGS. 3A and 3B, the optical fibers 40 are shown crossing each other directly. For better protection from mechanical damage, the laminate 5 can be used with the intermediate layer 45 to separate the optical fibers 40 as shown stylistically in FIG. 4. This embodiment of FIG. 4 has the advantage that the point load on each optical fiber 40 at the crossing point is greatly reduced since the optical fibers 40 do not touch each other directly. The crossing points of the optical fibers 40 are thus buffered. This reduces greatly the mechanical stress on the individual optical fibers 40. In practice, the second polymer layers 20 of the embodiment of FIG. 4 will also be compressed as was illustrated in FIG. 3B. This is, however, not shown in FIG. 4 for reasons of simplicity.

The laminate 5 and intermediate layer 45 can be used to manufacture routing devices similar to those illustrated in U.S. Pat. No. 5,204,925. In the routing device disclosed in this patent document, the optical fibers are placed in the same plane and cross each other which, as mentioned above, leads to mechanical stress on the optical fibers. Using the laminate 5 of the current invention, the optical fibers can be arranged in a plurality of planes such as shown in FIG. 4, each plane being separated by a laminate. Buffering the optical fibers 40 by using the invention described above reduces the mechanical stresses on the crossing points of the fibers which leads to reduced mechanical damage to the fibers and thus longer product life as well as less transmission loss within the optical fibers 40.

Although a few exemplary embodiments of the present invention have been described in detail above, those skilled in the art readily appreciate that many modifications are possible without materially departing from the novel teachings and advantages which are described herein. Accordingly, all such modifications are intended to be included within the scope of the present invention, as defined by the following claims.

Having described the invention, what is claimed is:

1. Optical device comprising:
   a first laminate and a second laminate between which are disposed a first plurality of optical components arranged in a first plane, wherein at least one of the first laminate or the second laminate comprises a first layer having high mechanical strength and a second layer having a porosity of greater than 18%.

2. The optical device according to claim 1, further comprising:
   a plurality of optical components being arranged at least partly in an adjacent plane as said first plurality of optical components, wherein at least one of said further plurality of optical components crosses at least one of said first plurality of optical fibers.

3. The optical device according to claim 2, wherein a third laminate is disposed between said first plurality of optical components and said further plurality of optical components and wherein said third laminate comprises at least a layer having high compressibility.

4. The optical device according to claim 3, wherein said third laminate further comprises two fixation means disposed on either side of said third laminate.

5. The optical device according to claim 4, wherein said two fixation means are adhesive layers.

6. The optical device according to claim 5, wherein at least one of said adhesive layers is selected from the group of adhesives having the properties that the adhesive is tacky at room temperature and pressure and hardens at a temperature between 50° C. and 100° C.

7. The optical device according to claim 6, wherein at least one said adhesive layer hardens at a temperature between 70° C. and 85° C.

8. The optical device according to claim 5, wherein at least one of said adhesive layers is formed from an adhesive tape.

9. The optical device according to claim 8, wherein said adhesive tape is selected from the group of adhesive tapes containing silicon, epoxy or acrylic adhesive soaked in ePTFE.

10. The optical device according to claim 5, wherein at least one said adhesive layers is a pressure-sensitive adhesive.

11. The optical device according to claim 5, wherein at least one of said adhesive layers is formed from an adhesive being selected from the group of acrylic, silicone or epoxy adhesives.

12. The optical device according to claim 3, wherein said third laminate further comprises at least one fixation means.

13. The optical device according to claim 12, wherein said fixation means is an adhesive layer.

14. The optical device according to claim 13, wherein said adhesive layer is selected from the group of adhesives having the properties that the adhesive is tacky at room temperature and pressure and hardens at a temperature between 50° C. and 100° C.

15. The optical device according to claim 14, wherein said adhesive layer hardens at a temperature between 70° C. and 85° C.

16. The optical device according to claim 13, wherein said adhesive layer is formed from an adhesive tape.

17. The optical device according to claim 16, wherein said adhesive tape is selected from the group of adhesive tapes containing silicon, epoxy or acrylic adhesive soaked in ePTFE.

18. The optical device according to claim 13, wherein said adhesive layer is a pressure-sensitive adhesive.

19. The optical device according to claim 13, wherein said adhesive layer is formed from an adhesive being selected from the group of acrylic, silicone or epoxy adhesives.

20. The optical device according to claim 1, wherein at least one of said first laminate or said second laminate further comprises fixation means for affixing the optical components.

21. The optical device according to claim 20, wherein said fixation means is an adhesive layer.

22. The optical device according to claim 21, wherein said adhesive layer is selected from the group of adhesives having the properties that the adhesive is tacky at room temperature and pressure and hardens at a temperature between 50° C. and 100° C.

23. The optical device according to claim 22, wherein said adhesive layer hardens at a temperature between 70° C. and 85° C.

24. The optical device according to claim 21, wherein said adhesive layer is formed from an adhesive tape.

25. The optical device according to claim 24, wherein said adhesive tape is selected from the group of adhesive tapes containing silicon, epoxy or acrylic adhesive soaked in ePTFE.

26. The optical device according to claim 21, wherein said adhesive layer is a pressure-sensitive adhesive.

27. The optical device according to claim 21, wherein said adhesive layer is formed from an adhesive being selected from the group of acrylic, silicone or epoxy adhesives.

28. The optical device according to claim 1, wherein said second layer is selected from the group of polymers consisting of expanded PTFE, polyethylene foams and polyurethane foams.

29. The optical device according to claim 28, wherein said second layer is expanded PTFE.

30. The optical device according to claim 29, wherein said glass fiber is stable to a temperature of at least 85° C.

31. The optical device according to claim 1, wherein said first layer has a tensile strength of 8,000–15,000 psi.

32. The optical device according to claim 31, wherein said first layer has a tensile strength of 12,000 psi.

33. The optical device according to claims 1, wherein said optical component is a glass fiber.

34. The optical device according to claim 33, wherein said optical fiber is stable to a temperature of at least 100° C.

35. The optical device according to claim 1, wherein said second layer has an air porosity of less than 73%.

36. The optical device according to claim 1, wherein said first layer is made from polyester.

* * * * *